Feb. 25, 1969    H. W. LORD    3,430,162
BROAD BAND HIGH POWER PULSE TRANSFORMER
Filed Dec. 28, 1964
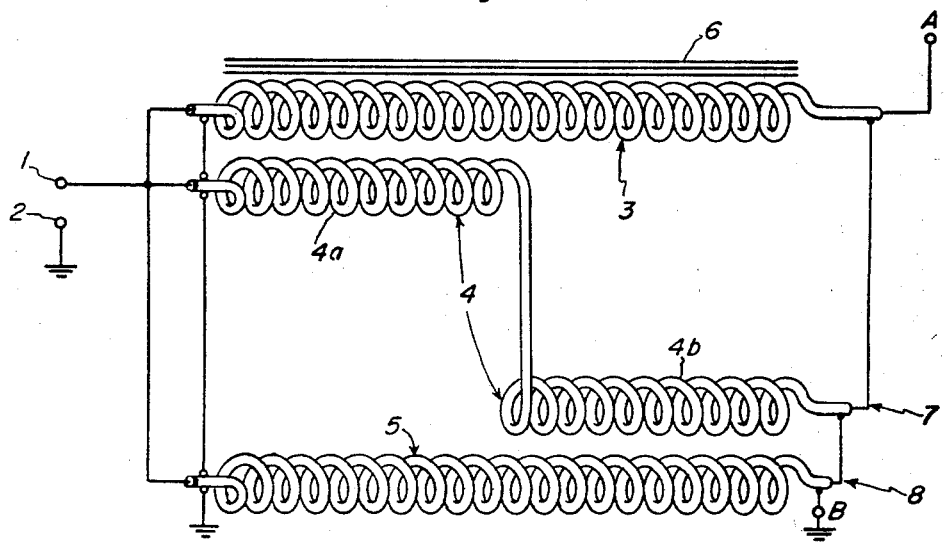
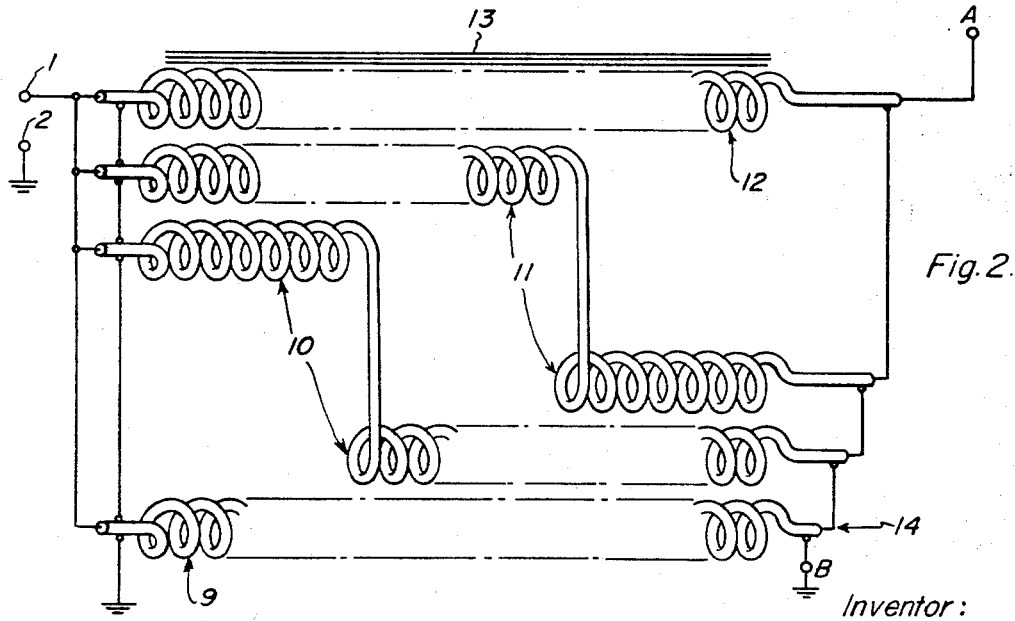
Inventor:
Harold W. Lord,
by John P. Dellitt
His Attorney.

United States Patent Office 3,430,162
Patented Feb. 25, 1969

3,430,162
BROAD BAND HIGH POWER PULSE
TRANSFORMER
Harold W. Lord, Schenectady, N.Y., assignor to General
Electric Company, a corporation of New York
Filed Dec. 28, 1964, Ser. No. 421,172
U.S. Cl. 333—33
Int. Cl. H03h 7/38
3 Claims

ABSTRACT OF THE DISCLOSURE

A high power pulse transformer with improved low frequency response is formed by connecting the input ends of a plurality of equal length transmission lines in parallel across a signal source with the output ends of the transmission lines being connected in series to provide a voltage step-up. The sheath of one transmission line is grounded at both the input and the output terminals of the transformer and serves as the principal source of excitation for a single ferromagnetic core upon which core the remaining transmission lines are wound in a number of turns to provide a reactance proportional to the square of the voltage present at the end of the line by virtue of the series connection. For high current pulse transformations, the transmission lines preferably are formed of three equally spaced flat conductors coiled in a pie configuration with one turn per layer arranged to form a spiral.

---

This invention relates to pulse transformers and particularly to such transformers as are suitable for high-frequency, broad band and high power services.

Combinations of transmission lines in various series-parallel arrays have been used to construct pulse and high-frequency transformers capable of passing short pulses with fast rise-times and fall-times. To provide adequate bandwidth, one or more such transmission lines are sometimes wound upon separate ferromagnetic cores whereby the output voltage is not materially loaded or shunted to ground. However, the inductive relation of transmission lines with these ferromagnetic cores has certain drawbacks inasmuch as the exciting reactance associated with the transmission line and core arrangement tends to limit bandwidth at the low-frequency end of the band. For example, this reactance tends to cause a droop across the top of a square input pulse and a voltage reversal in the end of the pulse. Moreover, the number of ferromagnetic cores required makes the application of this technique cumbersome at high power levels.

It is therefore an object of the present invention to provide a transmission line pulse transformer providing improved bandwidth, and which is particularly useful at higher power levels.

In accordance with the present invention, plurality of transmission lines of equal electrical length are fed in common from a single input, i.e., their inputs are connected in parallel, while the transmission line outputs are intercoupled in series, whereby a voltage step-up is attained corresponding to the number of transmission lines in the circuit. If a first transmission line is considered a ground-end line, because one side thereof is grounded, each other line whose output is successively coupled in series with the output of the ground-end line provides a voltage increase substantially equal in value to the value of the common input pulse voltage. In accordance with the present invention, a common ferromagnetic core is inductively or electromagnetically associated with a plurality of said other lines leading to successively higher voltage points in the output series connection and these lines have a proportionally increased inductive relation to the common ferromagnetic core. For instance, such transmission lines, which conveniently comprise coaxial cables, are each at least partially wound around a common ferromagnetic core and the extent or number of turns of each such line wound on the ferromagnetic core is substantially proportional to the voltage occurring in the aforementioned series connection at the end of the particular line.

The majority of the exciting current for the ferromagnetic core is supplied from the source through the ground-end line, and since only one core is employed, the exciting current present in the circuit is materially reduced. A circuit equivalent for the transformer may comprise a uniform transmission line with the exciting reactance across the end. Of course, this equivalent does not take into consideration the voltage step-up, but is an equivalent referred to the "primary" of the transformer. In any case, the presence of only a single exciting reactance across the end of the line, representing the single excitation for the single common core, substantially improves the bandwidth, e.g., pulse droop, characteristics of the transformer. Also, since one core is employed, appreciable power can be transmitted without a cumbersome arrangement of cores and their attendant excitation losses.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of a first embodiment of the present invention, and FIG. 2 is a schematic diagram of a second embodiment of the present invention.

Referring to FIG. 1, a first exemplary embodiment according to the present invention includes input terminals 1 and 2, the latter terminal being grounded. A number of substantially equal-electrical-length transmission lines 3, 4 and 5 are coupled to receive their input in common at terminals 1 and 2. In this embodiment, these transmission lines are coaxial cables comprising a central conductor and outer sheath conductor insulated from the central conductor. The outer sheath at the input end of each line is connected to terminal 2 and therefore grounded while the central conductors are coupled to terminal 1. Output ends of lines 3, 4 and 5 are coupled in series between a grounded terminal B, and high voltage terminal A. The central conductor from line 3 at the output end of the line is connected to terminal A while its sheath is connected to central conductor 7 at the output end of line 4. Similarly, the sheath of line 4 is connected to central conductor 8 of line 5 and the sheath of line 5 is desirably grounded at terminal B.

In operation, a signal voltage pulse impressed upon input terminals 1 and 2, travels down each of the lines and this signal voltage arrives simultaneously at the output end of each line. Line 5, conveniently designated the ground-end line, present its output voltage at its central conductor 8 with respect to ground. Since the output end of line 4 is coupled in series therewith, the two voltages add, and the output voltage at central conductor 7 of line 4 with respect to ground will be twice the input voltage. Similarly, the combined output voltage at terminal A is substantially three times the input voltage. Thus an integral voltage step-up of three is provided in accordance with this transformer embodiment. One might expect the voltage present at central conductor 8 of line 5 to be shunted by a path to ground through the sheath of line 4. Similarly, it seems a voltage present at conductor 7 would be shunted by the sheath of line 3.

However, in accordance with the present invention, portions of lines 3 and 4 are inductively related to a common core represented at reference numeral 6 in the drawing. In the embodiment of FIG. 1, coaxial transmission line 3 is desirably wound upon this core, the representation being schematic for ease of understanding. Also, a portion 4a, comprising approximately one-half of transmission line 4, is wound upon common core 6, with the number of turns 4a wound upon the common core and the core area being selected so the output voltage of line 5 is not materially loaded by a path to ground through the sheath of line 4. Since the voltage with respect to ground at the central conductor 7 of line 4 is twice that of the output of line 5, approximately a double length of line 3 is inductively associated with or wound upon common core 6. Therefore central conductor 7 is not materially loaded by a path to ground through the sheath of transmission line 3, but the sheath side of the transmission line provides an inductive reactance to ground. The number of turns are proportioned for presenting a reactance at respective points in the output serial connection whereby the voltages at these points are not materially loaded with a path to ground comprising the sheath of the next transmission line. It may also be said that the portion of each line which is wound on a ferromagnetic core is substantially proportional to the voltage provided between its sheath and ground.

Core 6 is not without effect upon the bandwidth of the transformer, for instance the droop across the top of a pulse passing through the transformer. However, according to the present invention, wherein portions of the plurality of lines are wound upon a common core, only one core is involved and only one core need be magnetized or excited. The exciting current passes principally through ground-end line 5 and the excitation required for the overall number of lines comprising the transformer is materially reduced. A circuit equivalent for the transformer in accordance with the present invention may comprise a uniform transmission line with an exciting reactance coupled across the output end of the line. Of course, this equivalent does not take into consideration the voltage step-up of the transformer but rather is an equivalent referred to the transformer's primary. In any case, the exciting reactance across the line, representing a single excitation of a single common core, substantially improves the bandwidth, e.g., the pulse droop characteristics of the transformer. Also since one core is employed, appreciable power can be transmitted without a cumbersome arrangement of cores and circuits. The respective transmission lines employed in accordance with the present invention preferably have a sufficient number of turns wound on the core in relation to the core area such that the said exciting reactance of the windings on the core is large in comparison to the characteristic impedance of the lines. The lengths of line portions not inductively related to common core 6, e.g., line 5 and line portion 4b, are conveniently coiled in helices not related to a ferromagnetic core. All the lines are of equal electrical length.

Referring to FIG. 2 illustrating a second embodiment of the present invention, a transmission line transformer comprises a ground-end transmission line 9, and second lines 10, 11 and 12. As in the previous embodiment, these lines are coaxial and are coupled in parallel at their input end, and in series at their output end providing a voltage step-up. At least portions of coils 10, 11 and 12 are inductively related to common core 13. This embodiment operates in the same manner as the one previously described but with a 4 to 1 voltage step-up instead of a 3 to 1 step-up. In this exemplary embodiment all of transmission line 12 is inductively related to core 13, two-thirds of line 11 is inductively related to core 13, and one-third of line 10 is similarly inductively related to core 13. The number of turns of line 10 inductively related to core 13, and the core area, are chosen so the voltage occurring at conductor 14 at the end of line 9 will not be materially loaded by a path to ground through the sheath of line 10. The portions of lines 11 and 12 inductively related to core 13 are then proportioned so the turns represented thereby increase in proportion to the voltage at the line sheath ends. The inductive reactance thereof increases as the square of the voltage. Since the voltage step-up along the transformer output serial connection increases by multiples of the input voltage at the end of each line, then the turns of such lines wound upon core 13 also generally increases by multiples of the section of line 10 wound upon core 13.

It is in general desired that each line section wound on core 13 be closely related to core 13 presenting low leakage inductance. However, in the case of windings not so closely coupled to the core, it is understood a greater portion may be required in order to achieve the required number of turns relative to the voltage increase taking place at the line end. It is also understood that no line need be inductively related to the core along its entire length so long as the ratio of turns to output voltage remains constant. For example, line 13 in the FIG. 2 embodiment, or line 3 of the FIG. 1 embodiment, need not be wound on the core throughout their length, even though it is usually convenient to do so.

The present invention is not restricted to the single ended transformer but likewise may present an output voltage balanced with respect to ground. For example, for balanced output, portions of lines on either side of a ground-end line may be wound on a common core with below-ground windings having their winding sense reversed on the common core. In the foregoing embodiments, coaxial transmission lines are employed by way of illustrative example. Other substantially uniform impedance transmission lines may be used in this type of transformer, provided they are arranged so the signals travelling down the lines do not react materially with each other or between adjacent turns of the same line. For example, transformers of this type have also been constructed using open two-wire lines or strip lines. For large conductor cross-sections it is advantageous to wind the coil segments in the form of pies, i.e., coils of flat conductors with one turn per layer arranged to form a spiral. The transmission line may then consist of three equally spaced flat conductors, the middle one corresponding to the central conductor of a concentric cable. In the illustrated embodiments employing a coaxial cable, a 0.5 microsecond pulse can be passed with an output rise time of 0.03 microsecond, and a negligible droop across the pulse. These constructions are feasible for 100 megawatt power applications and greater, and step-up to voltages on the order of 300 kilovolts or higher.

While I have shown and described several embodiments of my invention, it will be apparent to those skilled in the art that other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A transformer comprising a plurality of transmission lines coupled in parallel to receive a common input from a common input connection and having the output of said lines connected in series whereby a voltage additive output is secured across the series connection, a common magnetic core, one said transmission line having one conductor grounded at opposite ends of said transmission line and providing a majority of the exciting current for said core, said remaining transmission lines being inductively related to said common core by a multiplicity of turns, the number of turns of each said line related to said core increasing by an incremental amount with lines connected at higher voltage locations relative to ground having a greater number of turns wound upon said core, the ratio of turns of each transmission line upon said core to the voltage at the end of the transmission line being constant to provide an inductive reactance to the voltage at the end of each line proportional to the square of the voltage present at the end of the line by virtue of the series connection.

2. A transformer comprising a plurality of coaxial transmission lines having their input terminals connected in parallel and their output terminals connected in series in order to provide additive voltage step-up at the output of said lines, a common core formed of magnetic material, successive of said lines having at least a portion thereof wound around said core, with lines connected at successively higher voltage locations in the output serial connection having a greater number of turns thereof wound on said core, wherein the turns of each coaxial line wound around said core is substantially proportional to the voltage present upon the outer sheath of such coaxial transmission line at the output end of such coaxial transmission line.

3. A transformer comprising a plurality of equal electrical length coaxial transmission lines coupled in parallel to receive a common input connection whereat the sheaths thereof are grounded, and having the output of said lines connected in series whereby a voltage additive output is secured across the series connection, a common magnetic core, the sheath of one serially connected transmission line being grounded at the output of said line, said transmission line providing a majority of the exciting current for said core, said remaining transmission lines being wound upon said common core in a multiplicity of turns directly proportional to the voltage between the sheath of the line and ground at the output of said line so that the sheath of each successive line provides an inductive reactance between the voltage at its output end and ground which reactance is proportional to such voltage squared.

References Cited
UNITED STATES PATENTS

| | | | |
|---|---|---|---|
| 3,025,480 | 3/1962 | Guanella | 333—33 |
| 3,123,781 | 3/1964 | Winningstad | 333—9 |
| 3,051,918 | 8/1962 | Germeshausen | 333—26 |
| 3,195,076 | 7/1965 | Morrison | 333—26 |
| 3,305,800 | 2/1967 | Velsink | 333—32 |

HERMAN KARL SAALBACH, *Primary Examiner.*

C. BARAFF, *Assistant Examiner.*